No. 719,798. PATENTED FEB. 3, 1903.
C. H. HERTY.
APPARATUS FOR COLLECTING CRUDE TURPENTINE.
APPLICATION FILED AUG. 16, 1902.
NO MODEL.
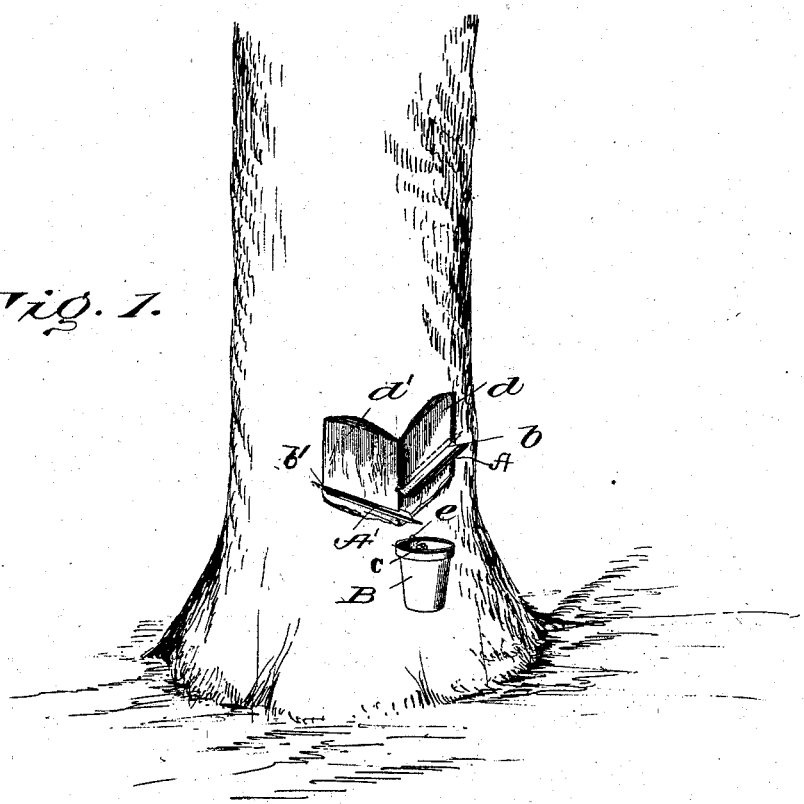
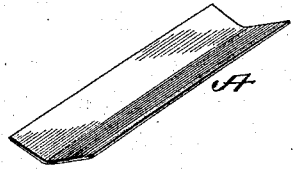
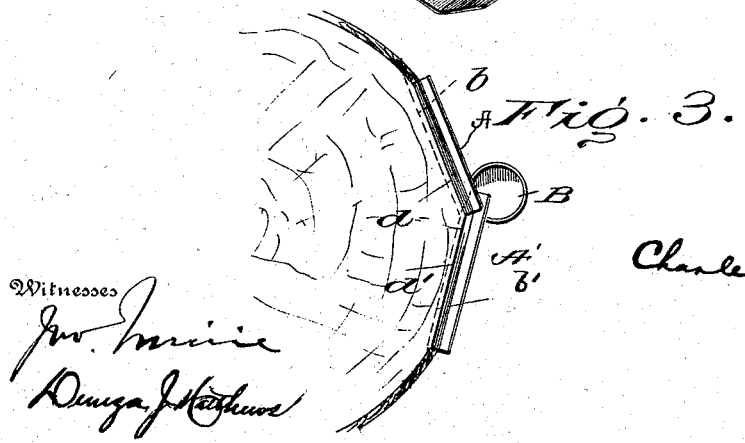

UNITED STATES PATENT OFFICE.

CHARLES H. HERTY, OF OCILLA, GEORGIA.

APPARATUS FOR COLLECTING CRUDE TURPENTINE.

SPECIFICATION forming part of Letters Patent No. 719,798, dated February 3, 1903.

Application filed August 16, 1902. Serial No. 119,935. (No model.)

*To all whom it may concern:*

Be it known that I, CHARLES H. HERTY, a citizen of the United States, residing in Ocilla, in the county of Irwin, State of Georgia, have invented an Improved Apparatus for Collecting Crude Turpentine, of which the following description, in connection with the accompanying drawings, is a specification, like characters on the drawings representing like parts.

My present invention has for its object to cheapen as well as to make more efficient the apparatus in common use for collecting crude turpentine as it runs from the tree; and it consists in certain novel constructions, as will be hereinafter described, and pointed out in the claims.

In the drawings, Figure 1 represents my invention complete; Fig. 2, one of my gutters or troughs, and Fig. 3 a top view of the gutters and cup.

The gutter or trough consists of a piece of material, preferably galvanized iron, bent or made into the shape of a trough or gutter having one of its sides adapted to be inserted into a cut or opening of a tree, said cut extending substantially the full length of the trough and the side of the cut extending over the edge of the trough. The tree has previously been slightly flattened by cutting off a portion thereof, as shown at $d$, and the opening or cut $b$ made in said flattened portion in any convenient manner, preferably by a stroke of a suitable ax. Close to the flattened portion $d$ I preferably flatten another portion $d'$ and make another opening or cut $b'$ and insert a second trough or gutter A′, but having one of its ends extending slightly under the end of the other trough or gutter, so as to catch any turpentine that may be collected in the upper gutter and that has run down therefrom. These cuts $b$ and troughs are inclined sufficiently to allow the turpentine to run down the inserted troughs. Said cuts are preferably inclined upwardly and sufficiently far inwardly to hold the troughs without further fastenings. A cup B is placed beneath the mouth of the lower trough in any convenient manner, the cup shown having an overflow-hole $c$ therein and being simply hung on a nail $e$, as shown, and the end of the lower trough should extend well over near to the middle of the cup. The overflow-hole prevents the cup filling to the brim with water. The cup is so placed on the tree that this overflow-hole is as far removed as practicable from the point at which the resin drops from the spout above. As the resin drops on the water in the cup it forms a circle on the surface, which circle soon fastens itself to the inner wall of the cup. Each fresh drop of resin now serves to weight down the mass of resin along the inside of the cup instead of increasing the diameter of the circle, until finally the resin reaches the bottom of the cup. Meanwhile as each drop of resin falls into the cup a drop of water is forced out at the overflow-hole, giving, finally, a mass of resin in the lower portion of the cup protected from evaporation by the remaining water above.

I have discovered that the cuts into which the troughs are inserted may cheaply be made by a single stroke of an expert axman and that when the troughs, which are easily and cheaply made, are inserted in the cuts the wood of the tree clamps them sufficiently tight to hold them against all ordinary disturbances, and the edges of the cups extending over the edges of the troughs prevent any leakage of the turpentine. The wood, however, does not clamp the troughs too tightly to prevent them being easily pulled out when it is desired to move them. As the trees, therefore, are scarred higher and higher each year, as is well understood in this art, cuts are made higher than those of the preceding year and the troughs easily taken out of the old cuts and inserted in the upper and new ones and the cups also elevated, thus collecting the crude turpentine at or near the place where it runs out of the tree, thus preventing the wastage by evaporation, &c.

There has been so little profit in the turpentine business that the old method of cutting a cup in the tree and allowing the turpentine to collect therein has been the only practical way of collecting the turpentine; but this entailed great waste on account of the great distance the turpentine had to run from the newly-scarred place on the tree to the cup. The crude turpentine also collected dust and trash on its greatly-exposed surface, and the deep gash cut in the tree frequently caused its death. With my apparatus, however, there is little exposure of the crude turpentine and no deep cut impairs the life of the tree. Moreover, I find that the yield from trees on which my apparatus was used has been greatly increased and that my apparatus costs only a little more than it cost to cut the deep gash of the old method.

What I claim as my invention is—

1. A device for collecting crude turpentine or the like from trees, consisting of an inclined trough having one of its sides inserted in a cut or opening in the tree the edge of the trough extending substantially the full length of the cut or opening whereby the trough will be held in place by the edges of the cut or opening and leakage of the crude turpentine past the trough will be prevented, substantially as shown and described.

2. A device for collecting crude turpentine or the like from trees consisting of an inclined straight-edged trough having one of its sides inserted in a straight cut or opening in the tree, the edge of the trough extending substantially the full length of the cut or opening whereby the trough will be held in place by the edges of the cut or opening and leakage of the crude turpentine past the trough will be prevented, substantially as shown and described.

3. A device for collecting crude turpentine or the like from trees consisting of a trough open at both ends and having one of its sides inclined and inserted in an inclined cut or opening in the tree, the edge of the trough extending substantially the full length of the cut or opening, whereby the trough will be held in place by the edges of the cut or opening, and the flow of turpentine directed to one of the open ends of the trough and leakage of the crude turpentine past the trough is prevented, and a vessel beneath said trough to collect the turpentine directed thereinto.

4. A device for collecting crude turpentine or the like from trees consisting of an inclined trough having one of its sides inserted in the cut or opening in the tree, the edge of the trough extending substantially the full length of the cut or opening whereby the trough will be held in place by the edge of the cut or opening and leakage of the crude turpentine past the trough will be prevented, a second trough oppositely inclined and projecting under the end of the first substantially as shown and described.

5. A device for collecting crude turpentine or the like from trees consisting of an inclined trough having one of its sides inserted in a cut or opening in the tree, the edge of the trough extending substantially the full length of the cut or opening whereby the trough will be held in place by the edge of the cut or opening and leakage of the crude turpentine past the trough will be prevented, a second trough oppositely inclined and a vessel thereunder having an overflow-hole therein substantially as shown and described.

CHARLES H. HERTY.

Witnesses:
 JNO. MINIE,
 DENIZA J. MATTHEWS.